(12) United States Patent
Yen et al.

(10) Patent No.: US 11,651,407 B2
(45) Date of Patent: May 16, 2023

(54) MIRRORED DISPLAY AND PROXIMAL CONTROL OF AUTONOMOUS RETAIL SYSTEMS

(71) Applicant: T-Mobile USA, Inc., Bellevue, WA (US)

(72) Inventors: Leon Chung-Dai Yen, Issaquah, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 33 days.

(21) Appl. No.: 16/216,584

(22) Filed: Dec. 11, 2018

(65) Prior Publication Data

US 2020/0184531 A1    Jun. 11, 2020

(51) Int. Cl.
  *G06Q 30/00*   (2012.01)
  *G06Q 30/0601*   (2023.01)
  *G06Q 10/08*   (2023.01)
  *G06Q 30/0645*   (2023.01)

(52) U.S. Cl.
  CPC ......... *G06Q 30/0623* (2013.01); *G06Q 10/08* (2013.01); *G06Q 30/0609* (2013.01); *G06Q 30/0645* (2013.01)

(58) Field of Classification Search
  CPC .............. G06Q 30/0623; G06Q 10/08; G06Q 30/0609; G06Q 30/0645
  USPC ..................................................... 705/26, 27
  See application file for complete search history.

(56) References Cited

U.S. PATENT DOCUMENTS

| 8,463,431 B2 * | 6/2013 | Segal | G06Q 30/02 |
| | | | 700/237 |
| 8,781,622 B2 * | 7/2014 | Mockus | G05B 15/02 |
| | | | 700/237 |
| 10,304,057 B1 * | 5/2019 | Powell | G07F 9/001 |
| 11,120,416 B2 * | 9/2021 | Kai | G06Q 20/327 |

(Continued)

OTHER PUBLICATIONS

First of Its Kind 'Traveler Tech Fest' Takes Off at DFW International Airport: Product demonstrations, kiosks and shops to enhance holiday travel; Win a Panasonic Toughbook laptop or power up for free Anonymous. PR Newswire [New York] Nov. 13, 2007, Dialog #453301833, 3pgs.*

(Continued)

*Primary Examiner* — Robert M Pond
(74) *Attorney, Agent, or Firm* — Lee & Hayes, P.C.

(57) ABSTRACT

Techniques for operating an autonomous retail system (ARS) are discussed herein. An ARS may include input devices, output devices, input-output (I/O) devices, and an inventory of items. The ARS may send or receive connection request with user equipment, such as a mobile device, and a connection may be established between the user equipment and the ARS. Techniques for identifying and authenticating the user equipment are discussed herein. The ARS may cause a display of the inventory of items on a display of the user equipment. The display of the ARS may be mirrored on the display of the user equipment. A user, via the user equipment, may provide indication(s) including a selection of an action such as a purchase action and selection of an item based on the action. Based on the indication(s), the ARS may dispense the item to the user. Scheduling techniques are discussed for the ARS to provide service to multiple customers.

20 Claims, 6 Drawing Sheets

(56) References Cited

U.S. PATENT DOCUMENTS

| | | | | |
|---|---|---|---|---|
| 11,144,923 B1* | 10/2021 | Griffith | .................. | H04L 63/102 |
| 2010/0100236 A1* | 4/2010 | Segal | ..................... | G07F 9/0235 |
| | | | | 700/232 |
| 2010/0262282 A1* | 10/2010 | Segal | ...................... | G07F 9/002 |
| | | | | 700/241 |
| 2012/0029691 A1* | 2/2012 | Mockus | ............. | G06Q 20/3224 |
| | | | | 700/232 |
| 2012/0239189 A1* | 9/2012 | Jaud | ...................... | G07F 9/0235 |
| | | | | 700/236 |
| 2015/0100152 A1* | 4/2015 | Barragan Trevino | ......................... | |
| | | | | G06Q 20/322 |
| | | | | 700/232 |
| 2016/0027103 A1* | 1/2016 | Benamour | ............. | G06Q 40/10 |
| | | | | 705/35 |
| 2017/0026505 A1* | 1/2017 | Yoshimura | ....... | H04N 21/41422 |
| 2017/0075962 A1* | 3/2017 | Hitchcock | .............. | G06Q 10/08 |
| 2018/0121912 A1* | 5/2018 | Morales | .............. | H04W 12/041 |
| 2018/0240096 A1* | 8/2018 | Patel | ..................... | G06Q 20/322 |
| 2018/0288594 A1* | 10/2018 | Kim | ...................... | H04W 12/63 |
| 2018/0300981 A1* | 10/2018 | Gaur | ..................... | G06Q 10/087 |

OTHER PUBLICATIONS

The Candy Machine Just Sold Me an iPod, Guarino, Mark, The Christian Science Monitor, Mar. 24, 2010, Dialog #405572044, 2pgs.*

"Vending makes great new career for entrepreneur who loves technology," Automatic Merchandiser 54.4: 56-60. Endeavor Business Media. (May 2012); Dialog #1019287608, 5pgs. (Year: 2012).*

* cited by examiner

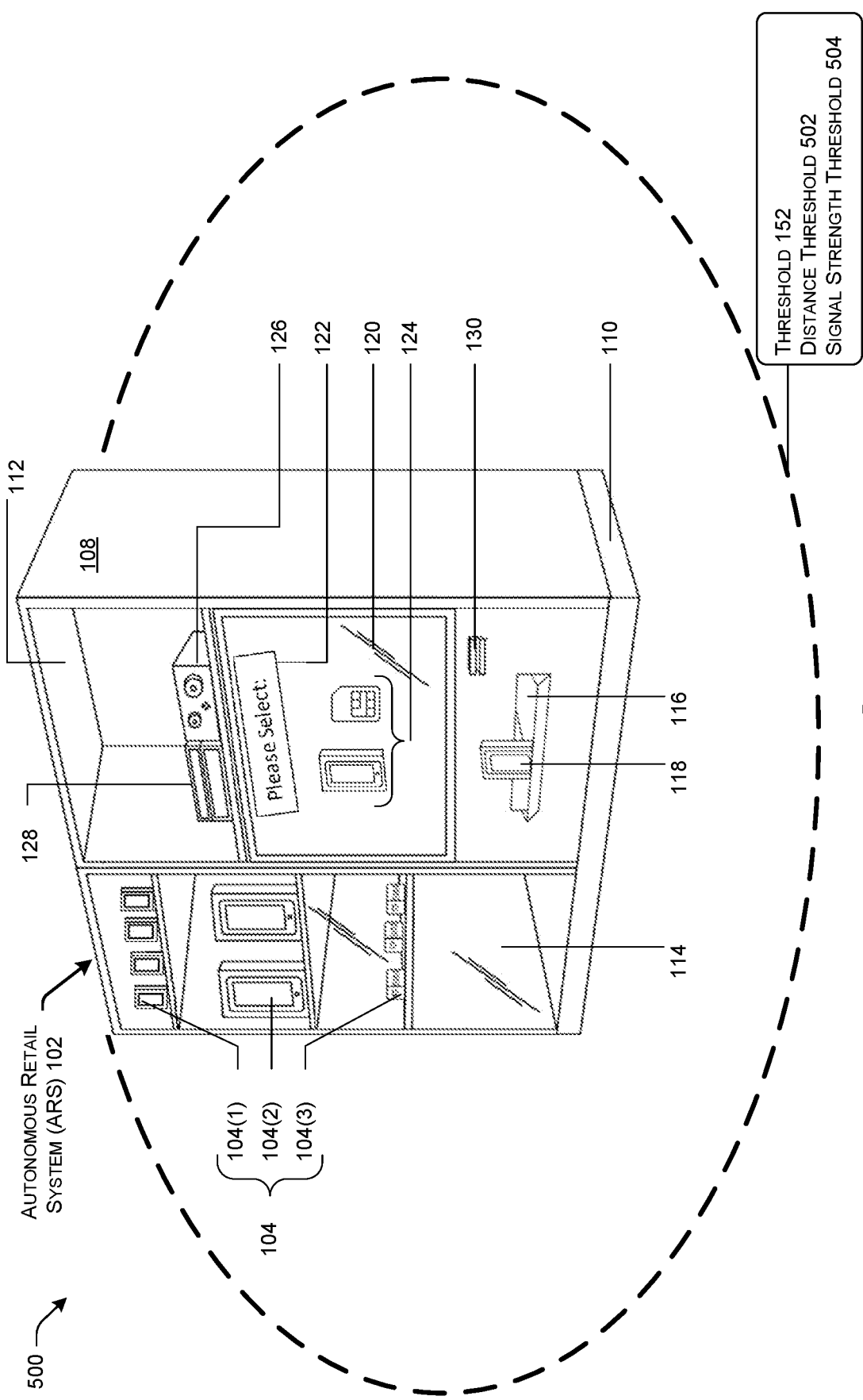

MIRRORED DISPLAY AND PROXIMAL CONTROL OF AUTONOMOUS RETAIL SYSTEMS

BACKGROUND

Technological advancements with respect to mobile devices and mobile technology (e.g., cellular communication technology) have increased the versatility of mobile devices. In some instances, mobile devices have replaced and/or supplemented existing, standalone devices. For instance, mobile devices are commonly used not only as telephones, but also, cameras, music players, portable gaming consoles, alarm clocks, electronic book readers, watches, photo albums, calculators, global positioning system (GPS) devices, flashlights, and numerous other devices.

To keep pace with the technological advancements with respect to mobile devices and mobile technology, there is a growing need for advancement with respect to smart device technology. In some instances, mobile devices are able to connect to, communicate with, and/or operate smart devices. A smart device may include an electronic device that can connect to other electronic devices via wireless protocols and/or radio access technologies. Traditional standalone devices often lacked the ability to be communicatively linked to mobile devices. Accordingly, there is a technological need to develop smart devices that empower users to realize the versatility, convenience, security, and various other benefits offered via mobile devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates an example ARS and a threshold, in accordance with embodiments of the disclosure.

DETAILED DESCRIPTION

Figure 1:
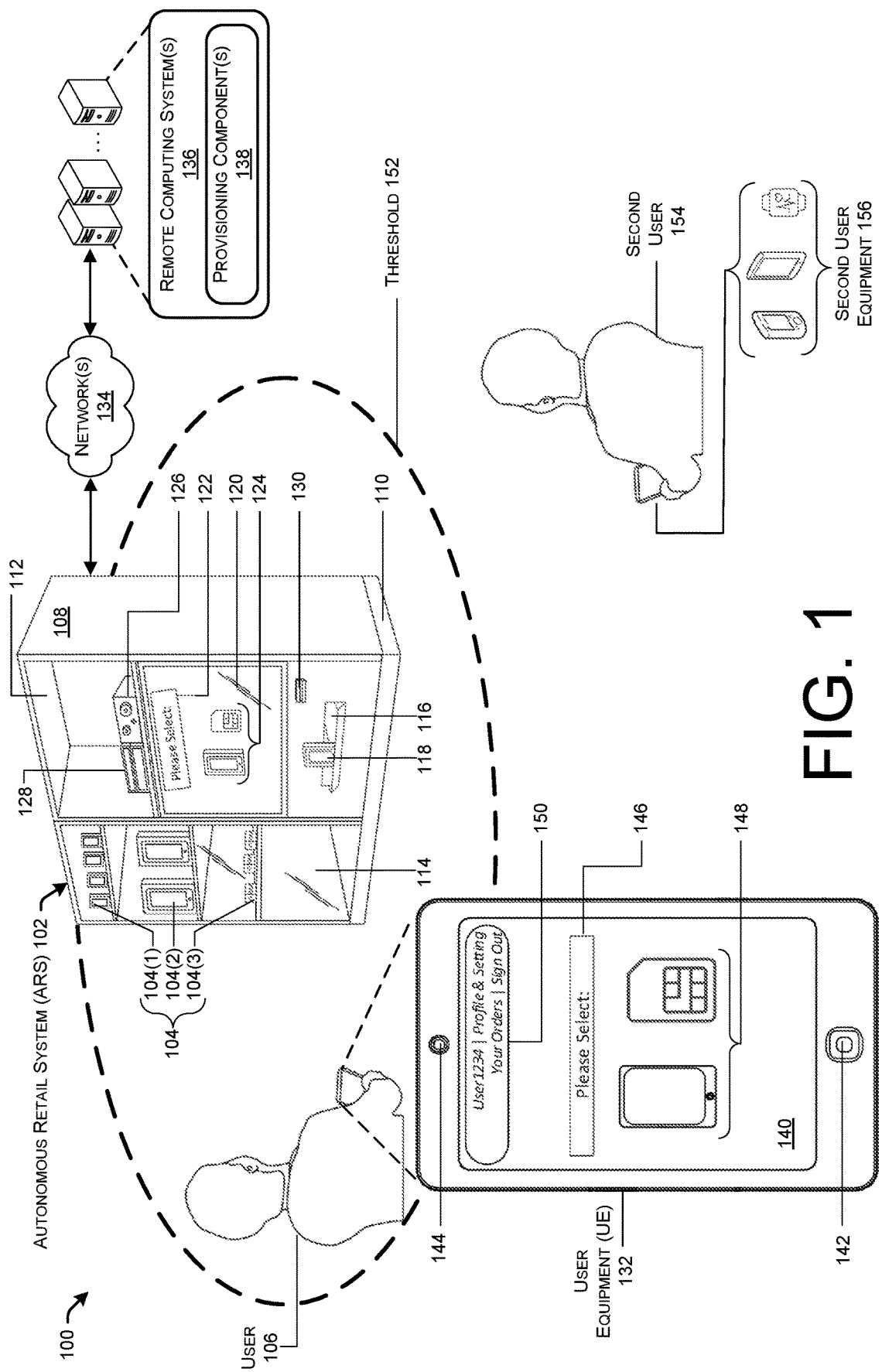
FIG. 1 illustrates an example environment including an autonomous retail system (ARS) and user equipment (UE), in accordance with embodiments in the disclosure.

The systems and processes described herein provide techniques for mirrored display and proximal control of an autonomous retail system ("ARS") via user equipment ("UE") (e.g., a mobile device). In addition, the techniques can include at least identifying a UE by an ARS, authenticating and connecting to the UE, causing display of an inventory associated with the ARS via a display of the UE, and/or dispensing an item of the inventory to a user associated with the UE. The techniques herein are directed at least to end-to-end item fulfillment from identifying and communicatively connecting a UE to an ARS to provisioning an item by the ARS. In various embodiments, the systems and processes described herein may be integrated into an electronic device (e.g., an electronic retail kiosk) as a software solution defining a server-client relationship between the ARS and the UE. For instance, an application may be installed on the UE such that the UE acts as a "client" and an application may be installed on the electronic device such that the electronic device acts as a "server."

In the context of retail automation, there are challenges providing customers with an end-to-end to retail experience from accessing a retail system to provisioning an item via the retail system. In some instances, an autonomous retail system may be used to automate retail transactions. In some instances, an autonomous retail system may include at least one of a semi-autonomous retail system, an automated retail system, and/or a semi-automated retail system. In some instances, an autonomous retail system ("ARS") may be referred interchangeably as an automated retail kiosk or an autonomous retail kiosk ("ARK").

Traditionally, stand-alone retail kiosks required customers to interact directly with the retail kiosk manually to retrieve an item. In some instances, these retail kiosks require customers to form queues to take turns interacting with the retail kiosk directly. In some instances, traditional stand-alone retail kiosks had problems relating at least to user accessibility (e.g., hard to reach areas of the retail kiosk), non-versatile hardware limitations restricting the ability to pay with various forms of payment instruments (e.g., cash, credit/debit cards, mobile payments, or digital wallets), and/or displaying a current inventory of the retail kiosk (e.g., a quantity of a particular type of bottled beverage).

In the field of retail automation, there are technical challenges at least with respect to protecting customer privacy, providing accessible item provisioning devices, and/or processing multiple customers. Traditional automated retail devices included retail kiosks. In some instances, automated retail devices may be located in populated, public spaces such as airports, bus stops, train stations, shopping malls, libraries, office buildings, and/or other private or public spaces that are accessible by many persons. These challenges represent a technological problem because they are based on at least insufficient hardware and software, and related systems and processes, to provide a private, accessible, and secure manner to interact and/or conduct transactions via an automated retail device.

With respect to privacy, technological challenges are a result of customers having to directly interact, often needing to stand directly in front of a device and to physically interact with an automated retail device. In some instances, an automated retail device may include one or more displays such as a graphic user interface for customers to interact with to complete an end-to-end transaction. However, in some instances and especially in the case of an automated retail device being located in a public space, transactions by a customer may be viewable by those persons passing by via the one or more displays. Personal privacy when conducting transactions is important to protect customer information relating at least to their user accounts, user settings, financial information, and/or purchasing behavior. Similar personal privacy challenges are faced when customers interact with automated retail devices without displays. In some instances, a lack of personal privacy may result in customer distrust when interacting with automated retail devices or when deciding whether or not to interact with an automated retail device.

With respect to accessibility, there are additional technical challenges that stem at least from customers having to interact directly, often manually or by touch, with automated retail devices. In some instances, an automated retail device may have a display or manual input buttons that are physically inaccessible to some customers. For instance, a height of a display may have hard to reach areas. In some instances, accessibility may relate to an inability to receive different types of payment and/or payment instruments from customers. For instance, some automated retail devices may be unable to receive cash, credit/debit cards, mobile payments, and/or digital wallets. In some instances, there may be hygienic and/or safety concerns when interacting with automated retail devices that result from multiple direct interactions by customers and/or non-costumers and their location in public spaces. These challenges represent a technical problem because requiring physical interaction(s) from customers is a result of hardware and software limitations associated with traditional automated retail devices.

With respect to security, there are technical challenges based on the limited interaction between a customer and a traditional automated retail device. For instance, an end-to-end transaction between a customer and a traditional automated retail device may occur via the following steps. A customer physically selects an item for purchase via manual buttons and/or one or more displays associated with the automated retail device. The customer may then provide a payment instrument to the automated retail device. Finally, the purchased item may be provided to the customer via the automated retail device. This example transaction may not require the automated retail device to identify, authenticate, and/or verify a customer and may not require the customer verification and/or customer authentication to complete the transaction. In some instances, an automated retail device may receive counterfeit payment from an unidentified user (e.g., counterfeit payment instruments). In some instances, a customer may provide a valid payment instrument to an automated retail device for an item, but the automated retail device fails to provide the item after payment is received (e.g., a retail kiosk "eating" money). In these instances, there is little recourse for both the owner/operator of the automated retail device and the customer because both remained unidentified, unverified, and/or unauthenticated. These challenges represent a technological problem because of insufficient systems and processes at the time of filing related to communicatively linking customers and automated retail devices to ensure proper transactions.

The techniques herein are also directed to the field of retail automation and solving the technological challenges noted above with respect to privacy, accessibility, and security. For instance, proximal control of an ARS via UE may address privacy challenges through enabling a user to conduct an end-to-end item fulfilment transaction via an associated UE. A user may communicatively connect to the ARS via the UE, navigate an inventory associated with the ARS, make a user selection of an item of the inventory, provide a payment instrument to the ARS and/or pay via the UE, and receive the item dispensed from the ARS. In some instances, the user may conduct this end-to-end transaction from the comfort and privacy of her personal and/or work-related UE. In some instances, the UE may communicatively connect to the ARS via an associated mobile application.

In some instances, proximal control of the ARS via the UE reduces physical accessibility challenges noted above by allowing a user to conduct a transaction via the UE rather than via a display associated with the ARS (e.g., reducing "hard-to-reach" portions of a display). In some instances, the transaction security challenges noted above may be mitigated by leveraging authentication information associated with a customer's UE. For instance, a customer may be asked to identify herself via account log-in information, biometric information, passcode and/or password information, or the like to conduct a transaction with an ARS.

In some instances, proximal control of the ARS may result in improved personal safety for users because users may maintain a proximal distance to the ARS and obscure personal and/or financial information by conducting the transaction via the UE. The techniques herein may provide additional benefits to both customers and retailers. With respect to customers, being able to conduct transactions via an associated UE may improve customer convenience and customer experience when interacting with an ARS. With respect to retailers, retailers may be able to improve customer satisfaction, encourage mobile application adoption (e.g., providing a retail mobile application to interact with a retailer's ARS) and reduce customer turnaround time (e.g., reduce end-to-end transaction time and/or schedule multiple customers).

Additionally, the techniques described herein enable an ARS to perform functions that previous automated retail devices could not perform. For instance, traditional automated retail devices faced challenges conducting transactions with multiple customers and/or schedule multiple customer transactions. These challenges were at least a result of customers needing to directly interface and/or interact with an electronic device. Techniques enabling an ARS to schedule multiple customers are described herein. The various embodiments described herein are further directed to the technological challenges noted above and to enabling an ARS to perform functions that previous automated retail devices could not perform.

An ARS may be at least one of a smart retail kiosk, a self-serve kiosk, a ticketing station, an online-to-offline locker, a prescription refill center, a food service retail kiosk and/or kiosk, a ticket will-call kiosk, electronic device recycling machines, automated teller machines (ATM), currency exchange machines, coin exchange machines, and the like. In some instances, the ARS may include an inventory with items. Items may include electronics (e.g., mobile phones, mobile phone accessories, SIM cards), food (e.g., packaged and/or prepared food), beverages (e.g., packaged, canned, or bottled beverages), and the like. The ARS may be located in frequently visited locations such as airports, bus stops, train stations, shopping malls, libraries, office buildings, and/or other private or public spaces that are accessible by many users. The ARS may advertise cellular-enabled devices and provide instructions to users about how to purchase such devices. In implementations, the ARS may be associated with a cellular service provider to sell UE for use on a network associated with the cellular service provider. Moreover, the ARS may be used to otherwise interact with the cellular service provider.

A UE may be at least one of a mobile device, a smartphone, a tablet computing device, or a cellular-enabled and/or wireless capable computing devices. In some instances, the UE may be able to enable connect to, communicate with, and/or operate smart devices (e.g., the ARS). A smart device may include an electronic device that can connect to other electronic devices via Bluetooth, near-field communication (NFC), Wi-Fi, wireless local area network (WLAN), light fidelity (Li-Fi), third-generation (3G) communication systems, fourth generation (4G) communication systems, fourth-generation long term evolution (LTE), fifth-generation (5G) communication systems, and comparable wireless protocols and/or radio access technologies.

By way of example, a traveler may be traveling via a commercial airline from Seattle-Tacoma International Airport, hereinafter "Sea-Tac," to Los Angeles International Airport, hereinafter "LAX." The customer may be traveling with a personal mobile device (e.g., UE) and a tablet device for work (e.g., a work-loaned tablet computing device). The traveler, after passing through security at Sea-Tac and currently waiting in an airport terminal for her flight, may discover the tablet device is malfunctioning and needs to obtain a new tablet device for work. In the airport terminal is an autonomous retail system (e.g., an ARS) for use by travelers. The ARS may include an inventory of electronic devices, including tablet devices, that are for sale or available to be rented. The ARS may also offer electronic device pick-up for those customers that have previously purchased a device for pick-up. In some instances, a "pick-up" may be referred to as a "retrieval action." The ARS may be owned and operated by a cellular service provider. The ARS may also include a large display (e.g., a light-emitting diode (LED) display) displaying the inventory of the ARS. In some instances, the inventory of the ARS may be concealed from view for security purposes. The ARS may also include a payment reader to receive payment instruments.

In various embodiments, the traveler may approach the ARS. The ARS may identify that the traveler's mobile device is proximal to the ARS. For instance, the traveler may be standing stationary at a distance of ten feet from the ARS. The ARS may send a request including at least one of a push notification, a short message service (SMS) message, a multimedia messaging service (MMS) message, a text-message, or electronic mail (E-mail) message to connect to the mobile device. In some instances, the ARS may periodically broadcast a beacon indicating a presence of the ARS. In some instances, the beacon may be a beacon signal. In some instances, the ARS may send a request to connect via a mobile application associated with a cellular service provider. In some instances, the request may include an invitation and/or hyperlink to download the mobile application associated with a cellular service provider. In some instances, the ARS may identify a mobile device using a proximity component that identifies electronic device below a physical distance threshold of the ARS (e.g., within 15 feet of the ARS) and/or above a time threshold. (e.g., a mobile device that is proximal to the ARS for at least ten seconds). In some instances, a time threshold may be referred to as a "time period threshold." In some instances, a cellular signal strength threshold may be used to determine a proximity of the UE to the ARS. In various embodiments, the ARS will not authorize and/or send a connection request from or to electronic devices that do not satisfy the distance and/or time thresholds. In some instances, a time threshold, distance threshold, and or signal threshold may be pre-defined by the ARS and/or the remote computing system.

In various embodiments and in response to receiving the request from the ARS to connect, the traveler may provide user information via the mobile device to the ARS to identify themselves. For instance, the traveler may accept a request to connect by the ARS by logging into a mobile application associated with a cellular service provider. In some instances, the mobile device may receive the beacon broadcasted by the ARS. In some instances, the ARS may broadcast the beacon using a cellular service provider that may be received by a mobile device using the same cellular service provider. In some instances, the mobile device may send a request to connect with the ARS in response to receiving the beacon. In some instances, the user information may include biometric information or passcode information obtained by leveraging biometric and/or security capabilities of the mobile device. In some instances, the user information may include information obtained after logging into a cellular service provider account and/or providing password information via a mobile application cellular service provider. In some instances, the user information may include profile information associated with a username and a user password. In some instances, the mobile device may receive the beacon broadcasted by the ARS, and in response, provide the user information to the ARS. For instance, the user information may include Mobile Station International Subscriber Directory Number (MSISDN) information and/or International Mobile Equipment Identity (IMEI) information associated with the mobile device.

In various embodiments, the ARS may then identify the traveler and establish a connection with the mobile device. In some instances, the ARS may identify a customer status of the traveler. For instance, the ARS may identify the traveler as having a service contract with the cellular service provider. The customer status may indicate whether the traveler has an account or is a customer with the cellular service provider that owns and/or operates the ARS. In some instances, the customer status may indicate that the traveler is a guest (i.e., does not have an account with the cellular service provider).

In various embodiments, the ARS may determine a current inventory. The current inventory may include electronic devices that are currently available for sale. In some instances, the current inventory may be determined by the ARS or by a remote computing device. In some instances, the ARS may determine a subset of items in the current inventory based on the customer status. For instance, customers of the cellular service provider may be able to purchase a particular mobile phone that is unavailable to non-customers of the cellular service provider. In various embodiments, the ARS may determine one or more actions associated with the current inventory and/or subset of the current inventory based on the customer status of the traveler. For instance, the ARS may determine that a particular mobile phone is available for purchase (e.g., a purchasing action) regardless of customer status. In some instances, the ARS may determine that an item in the current inventory can only be rented by a customer of the cellular service provider (e.g., a renting action).

In various embodiments, the ARS may display the subset of items of the current inventory and one or more actions. In some instances, the ARS may display the subset of items and the one or more actions via one or more displays included in the ARS. For instance, the traveler may be able to view an LED display on the ARS standing in the airport terminal at a distance of ten feet from the ARS.

In various embodiments, the ARS may cause the subset of items and the one or more actions to be displayed via the mobile device. For instance, the ARS may mirror the one or more displays included in the ARS on the mobile device of the traveler. In some instances, the ARS may send data to the mobile device associated with displaying the subset of items and the one or more actions to be displayed via the mobile device. The traveler may see a tablet device in an upper left corner of the LED display on the ARS. The ARS may then mirror the display on the mobile device such that the traveler is able to see a graphic element representing the tablet device in the upper left corner of her mobile device. In some instances, the ARS may mirror the layout of the items displayed on the ARS on the mobile device. For instance, if a subscriber identification module (SIM) card is displayed at a first location on a first display on the ARS, a graphic element representing the SIM card may be mirrored and/or displayed at a second location on a second display on the mobile device, the first location corresponding to the second location. In some instances, "mirrored" may be referred interchangeably as a "mobilized". In some instances, the one or more actions may be displayed on the mobile device.

In various embodiments, the traveler may then select the action (e.g., a purchase request) and a corresponding item (e.g., a tablet device) to be sent to the ARS. The traveler may then pay using a digital wallet and/or mobile payment for the tablet device with credit card information stored by a mobile application associated with a cellular service provider and/or associated backend systems. In some instances, the traveler may purchase the tablet computing providing a payment instrument such as a credit card to the payment reader included in the ARS. In various embodiments, the ARS may process the sales order, the payment, and provide a sales order confirmation to the mobile device.

In various embodiments, the ARS may then dispense the tablet device to the traveler. In some instances, prior to dispensing the tablet device, the ARS may associate the tablet device with a user, user equipment, and/or a user account with a cellular service provider prior to dispensing the tablet device. For instance, after the traveler selects and/or provides payment for the tablet device, the ARS may locate the selected tablet device. Next, the ARS may scan a code at least on a product packaging of the tablet device. The ARS may then register the tablet device to the traveler and/or a service provider account, based at least on the previously received user information, scanned product packaging information, and/or payment information. For instance, the registered tablet device may be dispensed via the ARS to the traveler such that the traveler does not have to activate and/or register the purchased tablet device.

In various embodiments, multiple travelers may be connected to the ARS attempting to complete an end-to-end transaction. For instance, a second traveler may have connected to the ARS via a second mobile device at a time after the traveler connected to the ARS. The ARS may schedule the first traveler to complete the transaction before the second traveler. In some instances, the first traveler and the second traveler may receive retrieval tokens from the ARS. For instance, a retrieval token may be sent to a mobile device upon establishing a connection between the mobile device and the ARS or upon providing a payment instrument to the ARS. In some instances, a service order may be based on the retrieval token(s). In some instances, the ARS may queue the first traveler and the second traveler based on a queue type (e.g., first-in, first-out (FIFO)).

In various embodiments, the mobile device may disconnect from the ARS and/or terminate a connection between the mobile device and the ARS. For instance, the traveler may walk away from the ARS in the airport terminal and toward a boarding gate in the Sea-Tac airport terminal. With the tablet device in hand, the traveler is prepared to leave rainy and gray Seattle, Wash. and head to sunny and blue-skied Los Angeles, Calif. In some instances, the connection may be terminated based on at least one of a time expiration, a connection time period, inactivity, a reduction in signal strength between the mobile device and the ARS, an increase in distance between the mobile device and the ARS, or a voluntary termination by the traveler via the mobile device. In some instances, the connection may be determined before or after completing the end-to-end transaction.

The systems, devices, and techniques described herein can be implemented in a number of ways. Example implementations are provided below with reference to the following figures.

FIG. 1 illustrates an example computing environment 100 that includes at least an autonomous retail system 102 ("ARS"). The ARS 102 may include inventory items 104 (which may be referred to individually as inventory items 104(1)-104(3)) that the ARS 102 is configured to dispense to a user 106. In some instances, inventory items 104(1)-104(3) may include electronic devices such as a mobile device inventory item 104(1), a tablet device inventory item 104(2), and an electronic device accessory inventory item (e.g., a SIM card) 104(3). In various embodiments, the inventory items 104 may include non-electronic items such as food and/or beverages. In some instances, the inventory items 104 may be a plurality of items associated with the ARS 102.

In various embodiments, the ARS 102 includes one or more walls 108, a base 110, and a roof or top 112, and may define an at least partially enclosed cabinet or stand-alone structure. The ARS 102 may define a merchandise display section 114 configured to contain at least some of the inventory items 104, available by the ARS 102. The merchandise display section 114 may include a viewing pane, e.g., of transparent plastic or glass, through which a user 106 can view inventory items 104. In some instances, the ARS 102 may include representations of the inventory items 104 including inventory items 104(1)-104(3), e.g., empty boxes, pictures, or the like, while maintaining the inventory elsewhere, e.g., hidden from view of the user 106. In some instances, the ARS 102 may not include the merchandise display section 114, instead keeping the physical inventory hidden from view. As also illustrated in FIG. 1, the ARS 102 may include a discharge port 116 at which a selected item 118 is presented for retrieval by the user 106. The ARS also may include one or more mechanisms for transferring the selected item 118 from inventory for presentation at the discharge port 116. By way of non-limiting example, the selected item 118 may be transported to the discharge port 116 using one or more actuators, belts, robotic assemblies, or the like.

In various embodiments, the ARS 102 may also include a display 120. In some instances, the display 120 may be configured to display one or more graphical user interface(s) facilitating interaction of the user 106 with the ARS 102. The display 120 may be a two-dimensional or three-dimensional type of display screen. For instance, a two-dimensional display screen may include at least a cathode ray tube display (CRT), a light-emitting diode display (LED), electronic paper (E-Ink), a plasma display panel (PDP), liquid crystal display (LCD), organic light-emitting diode (OLED), electroluminescent display (EL), backlit liquid crystal (LC), quantum dot display (QLED), active-matrix organic light-emitting diode (AMOLED), and/or the like. A three-dimensional display may include a swept-volume display, a laser display, a holographic display, a light field display, and/or the like. In some instances, the display 120 may be a touch-sensitive display and/or additional input devices may be associated with the ARS 102 to promote interaction with the graphical user interface(s). In examples described herein, the display 120 may present and/or display a textual element 122, an advertisement(s), a selectable field and/or an input field to facilitate collection of information from the user 106, an inventory graphic element 124 representing the inventory items 104 and/or the inventory items 104(1)-104(3), multimedia entertainment, and/or other marketing, retail, and/or entertainment purposes.

By way of non-limiting example, the user 106 may interact with the display 120 directly to browse and/or select items available in the inventory items 104 associated with the ARS 102. In some instances, the textual elements 122 may provide the user 106 with instructions to purchase an item, item pricing information, quantity information, and or descriptions of inventory items 104(1)-104(3) and additional inventory items that may be unavailable or are "sold-out" at the ARS 102. For instance, a textual element 122 may instruct a user 106 to "please select" an item for purchase. In some instances, the inventory graphic elements(s) 124 may include icon(s) and/or list(s) representing the inventory items 104 and including inventory items 104(1)-104(3). For instance, inventory graphic elements 124 may depict a tablet device associated with inventory item 104(2) and a SIM card associated with inventory item 104(3). In some instances, the inventory graphic element(s) 124 may be sorted at least with respect to price (e.g., price high-to-low or price low-to-high), popularity, a rating (e.g., a scale of 1-10 or 1-5 stars), and/or relevance. Additional functionality relating to the display 120 is described further herein.

In various embodiments, the ARS 102 also may include additional input/output (I/O) devices configured to assist the user 106 in interacting with the ARS 102, including to purchase and/or otherwise obtain an item from the inventory items 104. For instance, a user 106 may purchase, rent, and/or pick-up an item from the inventory items 104. In some instances, the ARS may include imaging sensors, including but not limited to one or more cameras 126 (e.g., a digital camera or other digital imaging device), one or more speakers 128 or other audio output devices, one or more printers, one or more microphones or other audio capture/recording devices, and/or one or more payment readers 130. In some instances, the camera(s) 126 may be configured to capture images, e.g., streaming video, of an environment of the ARS 102 and/or the user 106 when the user is interacting with the ARS 102. In some instances, the camera 126 may be function as a surveillance device to capture images and/or videos proximal to the ARS 102. As described further herein, image data captured by the camera 126 and may be used to verify an identity of a user 106 (e.g., image recognition, facial recognition, etc.) or an identity of the UE 132 (e.g., IMEI, username and password, etc.), as discussed throughout this disclosure. The speaker(s) 128 may be configured to output verbal cues, e.g., spoken instructions, to assist the user 106 with interacting with the ARS 102, and the microphone(s) may be used to receive verbal instructions from the user 106. In some instances, the speaker(s) 128 may be recite textual elements 122 and/or inventory graphic elements 124 to meet an accessibility need of the user 106. The payment reader(s) 130 may facilitate payment by the user 106, e.g., using a credit card, debit card, mobile payment, cash, and/or other forms of payment.

In various embodiments, additional I/O devices may be associated with the ARS 102. The ARS 102 may include a communication component, e.g., a transceiver (not shown), that facilitates wireless communication between the ARS 102 with other devices, including but not limited to user equipment 132 ("UE") associated with the user 106. In some instance, the user equipment 132 may include at least one of smart phones, mobile devices, mobile phones, tablet computers, portable computers, laptop computers, personal digital assistants (PDAs), electronic book devices, or any other portable electronic devices that can generate, request, receive, transmit, or exchange voice, video, and/or digital data over a network 134. In some instances, the network may include Bluetooth, near-field communication (NFC), radio access network (RAN), Wi-Fi, wireless local area network (WLAN), light fidelity (Li-Fi), second-generation (2G), third-generation (3G) communication systems, fourth generation (4G) communication systems, fourth-generation long term evolution (LTE), fifth-generation (5G) communication systems, and comparable wireless protocols, internet protocols, and/or radio access technologies. In some instances, the network 134 may include any type of wired or wireless network such as a Wi-Fi network, a cellular network, a radio access network (RAN), a local area network (LAN), a wide area network (WAN), and so forth.

In various embodiments, the ARS 102 may exchange data with one or more remote computing systems 136 via one or more network(s) 134. In examples described further herein, the remote computing system(s) 136 may comprise a cellular network provider and may include a provisioning component 138. As described further herein, the provisioning component 138 may include functionality for provisioning an item from the inventory items 104 that is selected by the user 106 prior to or at the time of dispensing the selected item 118. In some instances, the selected item 118 may be a mobile device or a SIM card from the inventory items 104. For instance, prior to dispensing the mobile device, a barcode on the packaging of the mobile device may be scanned via a barcode scanner and/or similar device. The scanned barcode may then be associated with the user 106 and/or an associated user account. The mobile device may then be dispensed and retrieved by the user 106 such that the mobile device is at least one pre-configured, configured, activated, and/or associated with a user account associated with the user 106. In some instances, the provisioning component 138 facilitates a user 106 being able to select, purchase, and retrieve an item from the ARS 102 that is immediately ready for use (e.g., the mobile device is dispensed with cellular connectivity to a cellular service provider).

In various embodiments, the UE 132 may be a mobile device. For instance, the UE 132 may include at least a UE display 140 (e.g., a touch display and/or multi-touch display), a home key and/or home button 142, and/or a UE camera 144. In some instances, the home key 142 may include a power button and/or a fingerprint sensor. In some instances, the UE 132 may include one or more UE cameras 144 including a front-facing camera, a rear-facing camera, facial detection, an infrared camera, front flash, and/or a rear flash. In some instances, the UE 132 may include additional features that are not illustrated in FIG. 1 including at least a speaker, a microphone and/or audio receiver, a lock button, a power button, volume button(s), a SIM card tray, a forward and/or back button, an ambient light sensor, a proximity sensor, a charging port, a universal serial bus port (e.g., USB types A, B, C, Mini-A, Mini-B, Micro-A, Micro-B, 1.0, 2.0, 3.0, or the like), a portable memory card slot, and/or a headphone jack.

In various embodiments, UE textual elements 146, UE graphic elements 148, and/or user account settings 150 may be displayed via the UE display 140. In some instances, the UE display 140 may display a UE textual element 146, may provide advertisements, may engage the user 106 to facilitate collection of information from the user 106, and/or may display additional object(s) or element(s) for other marketing, retail, and/or entertainment purposes. In some instances, the UE display 140 may display a UE graphic element 148 representing the inventory items 104 and/or including the inventory items 104(1)-104(3), videos/or images for the entertainment of the user 106, user account settings 150 (e.g., profile settings, order(s), order(s), and/or a log-in/log-out).

In some instances, the UE 132 may display UE textual elements 146, UE graphic elements 148, and/or user account settings 150 via the mobile application associated with a cellular service provider. In some instances, the user 106 may interact with the UE display 140 directly to browse and/or select items available in the inventory items 104 associated with the ARS 102. In some instances, the UE textual elements 146 may provide the user 106 with instructions to purchase an item, item pricing information, quantity information, and/or descriptions of the items in the inventory items 104 (e.g., inventory items 104(1)-104(3)), a subset of items of the inventory items 104, or additional inventory items that may be unavailable or are "sold-out" at the ARS 102. In some instances, a UE textual element 146 may instruct a user 106 to "please select" an item for purchase via the UE 132. In some instances, the UE graphic elements(s) 148 may include icon(s) and/or list(s) representing the inventory items 104 including inventory items 104(1)-104(3). For instance, UE inventory graphic elements 148 may depict a tablet device representing inventory item 104(2) and a SIM card associated with the inventory item 104(3). In some instances, the UE graphic element(s) 148 may be sorted at least with respect to price (e.g., price high-to-low or price low-to-high), popularity, a rating (e.g., a scale of 1-10 or 1-5 stars), and/or relevance.

In various embodiments, the ARS 102 may include a communication component to communicatively connect to the UE 132. As described herein, "communicatively connect" may be referred interchangeably with "connect." In some instances, the ARS 102 may identify, determine, authorize, generate, and/or send a request to connect with the UE 132 based on the UE 132 being within a threshold 152 of the ARS 102. In some instances, the ARS 102 may identify and/or send a request to connect to the UE 132 via the communication component. In some instances, the ARS 102 may identify and/or send a request via a mobile application associated with a cellular service provider via the UE 132. In some instances, the ARS 102 may send a notification (e.g., a SMS, MMS, and/or E-mail) to the UE 132 to download a mobile application associated with a cellular service provider to facilitate connection and/or communication between the ARS 102 and the UE 132. In some instances, the ARS 102 may broadcast a beacon that is received by the UE 132. In response, the UE 132 may send the connection request to the ARS 102. In some instances, the beacon may be broadcasted periodically or continuously.

In various embodiments, the threshold 152 may be based on a distance threshold, a time threshold, and/or a signal strength threshold. With respect to a distance threshold, the distance threshold may be a physical distance. For instance, the UE 132 may be stationary at a distance of 15 feet from the ARS 102. The ARS 102 may identify the UE 132 using a proximity component that identifies the UE 132 based on a distance threshold of the ARS 102 (e.g., 15 feet). If the ARS 102 determines the UE 132 is located at a physical distance from the ARS 102 that is below the distance threshold, the ARS 102 may communicatively connect and/or couple with a UE 132. In some instances, the UE 132 may be located at a physical distance from the ARS 102 that is above the distance threshold, and therefore, the ARS 102 may not connect to the UE 132. In some instances, the distance threshold may be a distance range. For instance, the distance threshold may be used to identify UE 132 that is physically located within a distance range (e.g., the UE is within one-to-five feet from the ARS 102). In some instances, the camera 126 associated with the ARS 102 may capture image data associated with a user 106 and/or a UE 132 to determine a physical position of the user 106 and/or the UE 132 relative to a physical position of the ARS 102. For instance, the image data may be used to determine whether a mobile device is within the distance threshold associated with the ARS 102. In some instances, the captured image data (e.g., data indicating a physical position of the user 106 and/or the UE 132) may be associated with signal data representing a signal strength and/or connections strength between the UE 132 and the ARS 102. For instance, the image data and the sensor data may indicate the UE 132 is within the threshold 152. In some instances, the image data and the signal data may be used in combination to determine the UE 132 is within the threshold 152 based on determining a confidence level indicating a probability the UE 132 is within the threshold 152.

In some instances, the ARS 102 may communicatively connect and/or couple with a UE 132 based on a time threshold. For instance, if a UE 132 is proximal (e.g., within a coverage range, a distance threshold, a signal strength threshold, and/or the like) to the ARS 102 and remains proximal for a period of time (e.g., 15 seconds) the ARS 102 may send the request. For instance, if the UE 132 is proximal to the ARS for a time period above a predetermined time threshold, the ARS 102 may communicatively connect to the UE 132. In some instances, the time threshold may be used to determine not to connect. For instance, if a UE 132 is proximal to the ARS 102 but does not remain proximal to the UE 132 for a predetermined period of time (e.g., the UE is a distance of five feet from the ARS for two seconds) the ARS 102 may determine that the UE 132 is just "passing by," and therefore will not communicatively connect.

In some instances, the time threshold may be a time range. For instance, a UE 132 that is proximal to the ARS 102 for a time between ten seconds to 120 seconds may be authorized to connect or be sent a request to connect. A time range may be used to determine that the UE 132 is non-stationary and/or moving away from the ARS 102 if the UE 132 is proximal to the ARS 102 for a short period of time (e.g., less than ten seconds). Conversely, the time range may be used to determine that the UE 132 is inactive or is associated with an inactivity period or a predetermined inactivity threshold based on the UE 132 remaining proximal to the ARS 102 for an extended period of time (e.g., more than 120 seconds) and/or the UE 132 has not received any input by a user 106. For instance, a UE 132 be located five feet from the ARS 102 satisfying either a distance or signal strength threshold. However, the UE 132 may not interact with the ARS 102 (e.g., accept a connection request sent by the ARS 102, send a request to connect with the ARS 102, and/or send a selection of an item to the ARS 102 via the UE 132) for a time period above an inactivity period threshold (e.g., 120 seconds) that may be predetermined. As a result, the UE 132 and the ARS 102 may fail to establish a connection and/or terminate an existing connection based on an inactivity time period exceeding an inactivity period threshold, a predetermined inactivity threshold, and/or a predetermined time period threshold. In some instances, an inactivity period may be determined based on an amount of time the UE 132 remains within the threshold 152 without sending a user information in response to a connection request. In some instances, a distance threshold, a time period threshold/time threshold, or signal strength threshold may be predetermined by the ARS 102 and/or the remote computing systems 136.

In some instances, a cellular signal strength threshold may be used to identify the UE 132 similar to the techniques described with respect to the distance and/or time threshold.

In some instances, a distance threshold, a time threshold, and/or a signal strength threshold may be used individually or in combination. In some instances, the threshold 152 may represent a two-dimensional area (e.g., a circle), a three-dimensional area (e.g., a sphere), or any suitable two-dimensional or three-dimensional area to identify a UE 132. In some instances, the threshold 152 may partially overlap with the ARS 102. In some instances, the threshold 152 may be centered on the ARS 102. In some instances, a time threshold, distance threshold, and/or signal threshold may be pre-determined and/or pre-defined by the ARS 102 and/or the remote computing system 136.

In various embodiments, the UE 132 may send or receive a request to communicatively connect with the ARS 102. The UE 132 may attempt to establish a connection with the ARS 102. In some instances, the UE 132 may provide user credential information to the ARS 102 to establish connection. In some instances, user credential information may include a user 106 logging into a mobile application associated with a cellular service provider via the UE 132. In some instances, user credential information may include a user 106 providing a password, a personal identification number (PIN), and/or passcode via the UE 132. In some user instances, user credential information may include providing biometric information via the ARS 102 (e.g., via the camera 126) and/or via the UE 132. For instance, biometric information may be provided by the user 106 via the UE 132 including at least one of facial information (e.g., facial detection and/or scanning via the UE camera 144 and/or an infrared component), fingerprint information (e.g., via the home key 142), voice information (e.g., via a microphone associated with the UE 132), or eye information (e.g., iris and/or retina via the UE camera 144 and/or an infrared component). In some instances, the ARS 102 may be operating in an offline mode (e.g., lacking network and/or cellular connectivity). The user 106 may still provide user credential information and/or profile information to connect with the ARS 102 operating in an offline mode. For instance, the UE 132 may receive a request to connect from the ARS 102 and/or the ARS 102 may receive a request to connect from the UE 132 via Bluetooth or similar wireless technology and/or personal area networks.

In various embodiments, after the ARS 102 and the UE 132 establish a connection, the ARS 102 may cause the inventory items 104, a subset of items of the inventory items 104, and/or one or more inventory items 104(1)-104(3) to be displayed via UE display 140 associated with the UE 132. UE graphic elements 148 may correspond to inventory graphic elements 124, which correspond to inventory items 104(2) (e.g., a tablet device) and 104(3) (e.g., a SIM card) included in the ARS 102. In some instances, the UE textual element 146 may correspond to textual element 122. For instance, the display 120 associated with the ARS 102 may instruct a user to "please select" an item for purchase. Similarly, the ARS 102 may cause the instruction "please select" an item for purchase to be displayed via UE display 140 associated with the UE 132. In some instances, the ARS 102 may send data to the UE 132, whereby the data may be associated with displaying, via the UE display 140, the inventory items 104, a subset of the inventory items 104, and/or the one or more inventory items 104(1)-104(3). For instance, sending the data may include sending a uniform resource locator (URL) to the UE 132, sending an indication (e.g., a command, a message, a notification, and/or instruction) to the UE 132 to display a previously received, stored, and/or retrieved media item associated with at least a subset of the inventory 104 via the UE display 140, sending an indication to the UE 132 to retrieve a media item associated with at least a subset of the inventory 104, and/or to cause a display of at least a subset of the inventory 104 to be displayed via the UE display 140. In some instances, the ARS 102 may send data to the UE 132 associated with displaying UE textual elements 146 and/or UE graphic elements 148.

In various embodiments, the UE textual element 146 may include one or more actions that a user 106 may select via the UE 132. For instance, the one or more actions may include purchase, rent, pick-up, or pay bill. In some instances, the UE textual element 146 may be displayed via the UE display 140 associated with the UE 132. For instance, the UE textual element 146 may include one or more actions that a user 106 may select. In some instances, and in response to the user 106 selecting an action, UE graphic elements 148 corresponding to inventory items 104 may be presented via the UE display 140. In some instances, the one or more actions that a user 106 may select via the UE 132 may include a drop-off action. For instance, the drop-off action may include a returning an item to the ARS 102 and/or inputting an item into the ARS 102. In some instances, the one or more actions that a user 106 may select via the UE 132 may include a rental action or an exchange action. The rental action may include the steps of purchasing an item via the ARS 102, but also includes the ARS determining a temporary time period that a user may possess the item before returning the item to the ARS 102 or an additional ARS owned, operated, and or maintained by the cellular service provider. In some instances, the one or more actions may be based on the user credential information provided by the user to 106 via the UE 132 to establish a connection with the ARS 102. For instance, a user 106 may log into a mobile application associated with a cellular service provider via a passcode of the UE 132, biometric information via the home key 142, and/or account log-in information via the UE 132. In response, the ARS 102 may determine if the UE 132 and the user 106 are account members with the cellular service provider (e.g., the user 106 currently has a service contract and/or a membership account with the cellular service provider). The ARS 102 may also determine that the user 106 and the UE 132 are "guests" (e.g., the user 106 does not currently have a service contract and/or a membership account with the cellular service provide). In some instances, based on the user credential information authenticating the user 106 has a membership account or a service contract with the cellular service provider, the user 106 may have an option to select, purchase, rent, or pick-up a previously purchased item via the ARS 102. In some instances, the user 106 may be presented with the select, purchase, rent, drop-off, and/or pick-up and options via UE textual element(s) 146.

In various embodiments, the display 120 may be screen mirrored onto UE display 140. In some instances, the screen may be mobilized onto the UE display 140. In some instances, screen mirroring may be achieved through a miracast, a reverse miracast, a cast, or similar wireless techniques. In some instances, a display resolution of the display 120 may be adjusted automatically to be compatible with the UE display 140. For instance, textual elements 122 and inventory graphic elements 124 may be located at a first and/or second location respectively of the display 120. The UE textual element 146 and UE graphic element 148 may be displayed, generated, rendered, and or presented at a third and/or fourth location respectively of UE display 140, wherein the first and/or second location substantially correspond to the third and/or fourth location. For instance, a SIM card (e.g., an inventory graphic element 124) displayed by the ARS 102 presented at an upper-left corner of the display 120. The display 120 may then be casted, or caused to be presented or displayed, via the UE display 140 such that the SIM card (e.g., a UE graphic element 148 corresponding to inventory graphic element 124) is presented at an upper-left corner of the UE display 140. In various embodiments, a location of the textual elements 122 and inventory graphic elements 124 displayed on display 120 do not substantially correspond to UE textual elements 146 and UE graphic elements 148 displayed on UE display 140. In various embodiments, a content (e.g., text and/or graphics) presented on display 120 may be reproduced on the UE display 140 to reflect the content. For instance, various electronic devices may be presented via the display 120 as icons. The ARS 102 may cause a list of the various devices to be presented on the UE display 140. In some instances, a UE 132 may display a selectable field, an input field and/or toggle button to switch between a list view and/or an icon view of graphic elements 148 for a user 106 to interact with. In some instances, UE graphic elements 148 may be sorted by a user 106 via the UE 132. For instance, a sort toggle and or a list of sorting options may be presented via the UE display 140 for a user 106 to select (e.g., a list that allows a user to sort UE graphic elements 148 by a price and/or a popularity). In some instances, the ARS 102 may cause presentation of an entirety or a portion of the inventory items 104 via the UE display 140. For instance, an ARS 102 operating in an offline mode, may present an inventory list representing the inventory items 104 via the UE 132.

In various embodiments, the user 106 may send a first selection associated with a selected action (e.g., purchase) and a second selection of an available item represented by UE graphic element 148 (e.g., a tablet device) via the UE 132 to the ARS 102. In some instances, the ARS 102 may then confirm the selected item (e.g., the selected item is included in the inventory items 104) and the selected action (e.g., the selected action can be completed based on the user credential information).

In various embodiments, the ARS 102 may request payment from the user 106. In some instances, the user 106 may pay with a mobile payment, digital wallet, or a payment instrument via the UE 132. In some instances, the user 106 may pay with a mobile payment, digital wallet, or a payment instrument via the payment reader 130 associated with the ARS 102. In various embodiments, the ARS 102 may authorize, confirm, authenticate, verify the payment internally or send a request for authorization, confirmation, authentication, and/or verification via a remote computing system 136. In some instances, the ARS 102 may send transaction information associated with the payment to verified by a third party.

In various embodiments, after the payment is confirmed, the user 106 may retrieve the selected item via the ARS 102. In some instances, the item may be retrieved via the discharge port 116. In some instances, the ARS 102 may send a notification of a receipt or confirmation of the purchase to UE 132 (e.g., via an E-mail or SMS message) or print a receipt that may be retrieved by the user 106.

In various embodiments, a second user 154 associated with a second UE 156 may attempt to connect to the ARS 102. In various embodiments, the second user 154 may not connect with the ARS 102 due to the threshold 152. For instance, the threshold 152 may represent a distance threshold, wherein the ARS 102 may connect to electronic devices located within the threshold 152. As depicted in FIG. 1, the second user 154 and the second UE 156 are located outside of the threshold 152 and therefore may not connect with the ARS 102. In some instances, the second user 154 and the second UE 156 may satisfy the threshold 152 such that a connection may be established with the ARS 102. In some instances, the user 106 and the second user 154 may simultaneously and/or partially simultaneously conduct an end-to-end transaction via their respective UEs. In some instances, the ARS 102 may assign a retrieval token to the user 106 via the UE 132 and the second user 154 via the second UE 156.

In some instances, the retrieval token may be sent based on a time and/or time period the UE 132 established a connection with the ARS 102, a time when the user 106 selected an action and/or selected an item, a time when the user 106 provided payment, or a time when the payment provided by the 106 was verified. In some instances, a notification may be sent via the ARS 102 to the UE 132 and/or the second UE 156 when it is their respective turn to retrieve an item from the ARS 102.

In various embodiments, multiple users may be scheduled and/or items may be dispensed to the user 106 and the second user 154 based on a queue type including at least one of first-in, first-out (FIFO) scheduling, last-in, first-out (LIFO) scheduling, a predetermined metric, a priority, or an urgency in a service order. For instance, with respect to an urgency, an ARS 102 may dispense items and/or complete transactions with multiple users in order of flight boarding times. For instance, the user 106 may have a first flight boarding time before a second flight boarding time of the second user, and therefore, a purchased item by user 106 may be dispensed first. In some instances, the ARS 102 may provide and/or print a physical ticket for the user 106 to retrieve and denoting an order to retrieve a purchased item.

In various embodiments, the connection between the UE 132 and the ARS 102 may be terminated. In some instances, the connection may be determined in response to an item being dispensed via the ARS 102, inactivity by the UE 132 (e.g., the ARS 102 does not receive a selection of an action and/or a selection of an item within a predetermined time period), a reduction in signal strength between the UE 132 and the ARS 102, an increase in physical distance between the UE 132 and the ARS 102, and/or voluntary termination by a user 106 associated with the UE 132 (e.g., a user 106 may log-out and/or disconnect via user accounting settings 150 presented on the UE display 140). In some instances, the connection may be terminated voluntarily (e.g., logging out of a mobile application associated with a cellular service provider) and/or involuntarily (e.g., walking from inside to outside the threshold 152).

Figure 2:
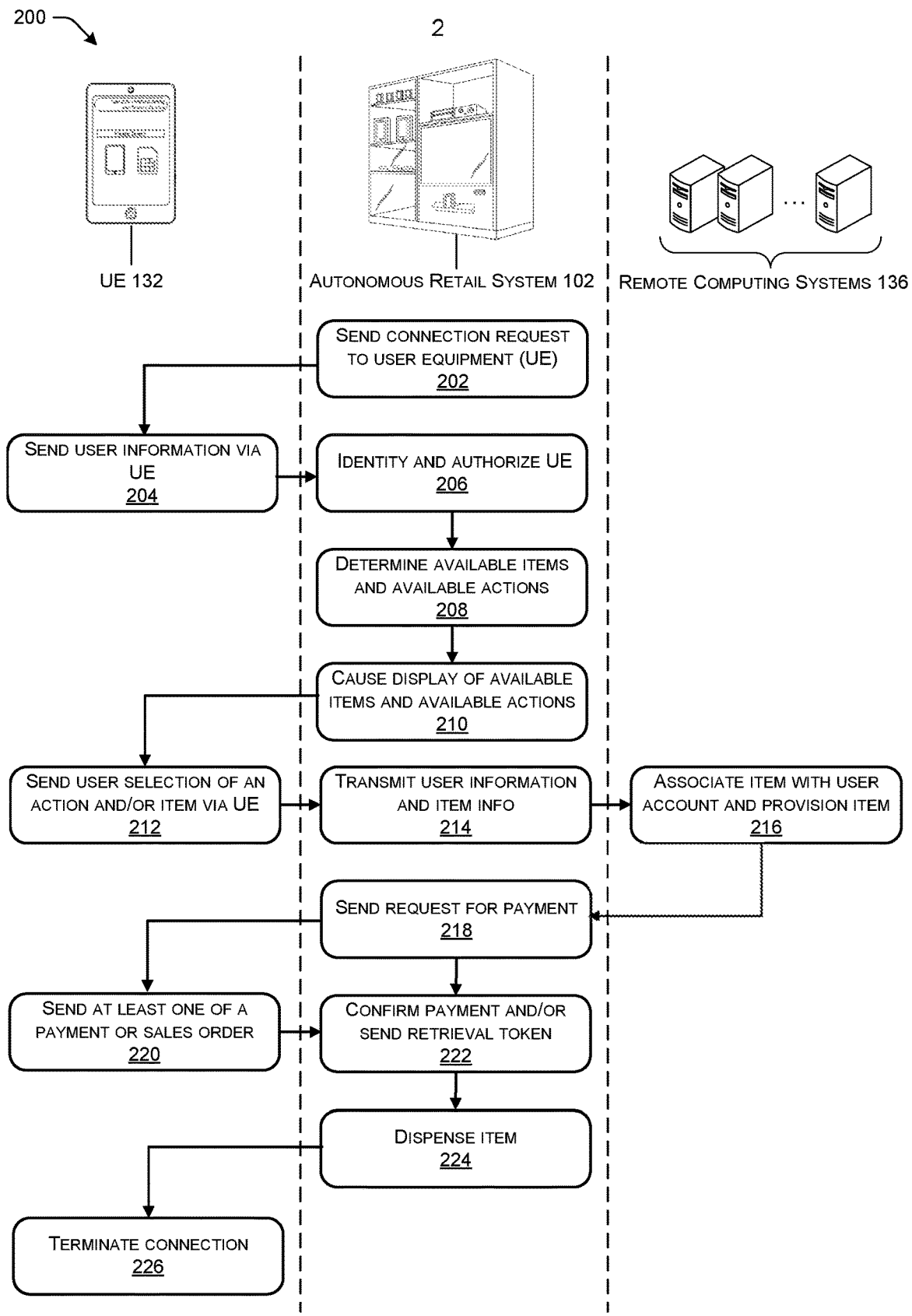
FIG. 2 illustrates an example process for dispensing an item via an ARS involving interactions between a UE, an ARS, and remote computing systems, in accordance with embodiments in the disclosure.

FIG. 2 illustrates an example process for dispensing an item via an autonomous retail system (ARS) 102 involving interactions between a UE 132, an ARS 102, and remote computing systems 136, in accordance with embodiments in the disclosure. The process 200 is illustrated as a collection of blocks organized under the respective entities, e.g., the UE 132, the ARS 102, and the remote computing system(s) 136, that may perform the various operations described in the blocks. However, other devices or software may perform the respective operations. The process 200 is described with reference to the computing environment 100.

At operation 202, the ARS 102 may send a connection request to a UE 132 (hereinafter and with respect to FIG. 2, "mobile device"). The connection request may be a notification or a request through a mobile application of a cellular service provider accessible via the mobile device. In some instances, the connection request may be sent to the mobile device based at least in part on the mobile device satisfying a threshold distance, threshold time, and/or threshold signal strength associated with the ARS 102. In some instances, the connection request may include a request for credentials such as an input field for a user account name and an associated user password and/or passcode associated with a cellular service provider. In some instances, the ARS 102 may broadcast a beacon that may be received by the UE 132. For instance, the ARS 102 may broadcast a beacon to a mobile device that is using the same cellular service provider as the ARS 102. In some instances, the beacon may be a beacon signal. In some instances, the ARS 102 may periodically broadcast the beacon. In some instances, the ARS 102 may continuously broadcast the beacon.

At operation 204, the user 106 may send user information via the mobile device to the ARS 102 in response to receiving the connection request. In some instances, the user information may include at least one of account information (e.g., a password, a PIN, or a passcode), biometric information obtained via the mobile device, and/or the ARS 102 (e.g., facial detection information or fingerprint information). In some instances, the user information may include providing a user account name and an associated user password and/or passcode. In some instances, the UE 132 may receive a beacon from the ARS 102. In response, the UE 132 may send the connection request and the user information to the ARS 102.

At operation 206, the ARS 102 may identify and authorize the UE 132. In some instances, the ARS 102 may determine a user name, a user purchasing history, a user rental history, a user location, and/or other information associated with the UE 132. In some instances, the ARS 102 may determine if the UE 132 is associated with an account with the cellular service provider or is a member of the cellular service provider. The ARS 102 may establish a connection with the mobile device based on the user information.

At operation 208, the ARS 102 may determine available actions and available items. For instance, the ARS 102 may have an inventory of items including tablet devices and SIM cards (e.g., available items) that a user may purchase, rent, and/or pick up (e.g., available actions). In some instances, determining the available actions and the available items may be based on receiving the user information at 202. For instance, the ARS 102 may receive user information that includes account information (e.g., a username and/or a passcode) from the UE 132. The ARS 102 may then determine the UE 132 is associated with a user 106 has an account with a cellular service provider, including a purchasing history and/or stored payment instruments. The ARS 102 may then determine the UE 132 has an available action to "pick-up" a previously purchased item via the ARS 102 or via cellular service provider's online website.

At operation 210, the ARS 102 may cause the available actions and available items to be displayed via the mobile device associated with the user 106. In some instances, a display on the ARS 102 presenting available actions and available items may be mirrored, miracasted, reverse miracasted, or casted to a mobile device display associated with the mobile device. In some instances, the available actions and available items may be presented on the mobile device display as icon(s) and/or list(s).

At operation 212, the UE 132 may send a selection of an action of the available actions and selection of an item of the available items. In some instances, the UE 132 may send a single selection representing a selection of an action and a selection of an item. In some instances, the UE 132 may send a first selection of an action and a second selection of an item. For instance, a user 106 may select via a touch-display of the mobile device a request to purchase (e.g., a first selection of an action) and a selection of the tablet device (e.g., a second selection of an item). In some instances, a first selection may be referred to as "first user input data" indicating a selection of the action. In some instances, a second selection may be referred to as "second user input data" indicating a selection of the item. In some instances, the UE 132 may be presented with available items based on selecting one or more available actions.

At operations 214 and 216, the ARS 102 may transmit user information, order information, and item information (e.g., a selection of an action and an item) to a remote computing service. In some instances, item information may include barcode information scanned by a barcode reader, or similar device, included in the ARS 102. The remote computing system(s) 136, may then receive the user information, order information, and item information to register a selected item (e.g., a tablet device) with a user account associated with the UE 132 and/or the user 106. In some instances, the selected item may be dispensed such that it is at least one of pre-configured, configured, activated, and/or associated with the user account such that a user 106 may immediately use the selected item upon retrieval. In some instances, operations 214 and 216 may be optional. For instance, if a user has selected to purchase a pair of headphones from the ARS 102, then the headphones may not need to be registered, provisioned, or otherwise associated with a user account prior to use.

At operation 218, the ARS 102 may send a request for payment to the mobile device based on the user selection of an action and/or item. In some instances, the ARS 102 may specify a type of payment it is able to receive. For instance, the ARS 102 may be configured to receive mobile payments and credit cards but not cash.

At operation 220, the user 106 may provide payment to the ARS 102 via the mobile device, a payment reader included in the ARS 102, or a display included in the ARS 102. In some instances, the user 106 may provide a payment instrument to the ARS 102 or may pay via a mobile payment/digital wallet via the mobile device.

At operation 222, the ARS 102 may confirm, authorize, and/or verify the payment. In some instances, the payment may be received from the user 106, the mobile device, or a third party such as a banking entity or a payment instrument issuer entity. In some instances, a second user may be conducting a transaction via a second mobile device at least partially simultaneously as the user 106. The ARS 102 may send a retrieval token scheduling and/or ordering the user 106 and the second user. For instance, the retrieval token may indicate that an item user 106 has purchased will be dispensed prior to an item that the second user has purchased. In some instances, the retrieval token may be based on when a user and their associated user equipment established a connection with the ARS 102 or when a user's payment was verified.

At operation 224, the ARS 102 may dispense the item for retrieval by the user 106 associated with the UE 132. In some instances, the ARS 102 may send a sale confirmation notification to the UE 132 associated with the user 106 or print a purchase receipt for retrieval by the user 106. In some instances, the ARS 102 may send a passcode, a barcode, a quick response (QR) code, and/or a PIN to the UE 132 via a notification. In some instances, the UE 132 must provide authentication to the ARS 102 to cause the item to be dispensed via the ARS 102. For instance, the UE 132 may receive a notification of a PIN via a mobile application associated with the cellular service provider. The user 106 may enter the PIN via the UE 132 or the ARS 102 to cause the ARS 102 to dispense the item. In some instances, the ARS 102 may require user input via the UE 132 to dispense the item (e.g., the ARS 102 scans a QR code send via notification to the UE 132 to trigger dispensing the item).

At operation 226, the UE 132 may terminate the connection with the ARS 102. In some instances, the termination may be voluntary (e.g., a user 106 logging out of a mobile application associated with a cellular service provider) or involuntary (e.g., the UE 132 moving away from the ARS 102 resulting in a reduction in signal strength between the UE 132 and the ARS 102). In some instances, the connection may be determined prior and/or during operations 208-224. In some instances, the UE 132 may terminate the connection with the ARS 102 based on a connection time between the UE 132 and the ARS 102. For instance, the connection time between a UE 132 and ARS 102 may be a quantitative value representing how long the UE 132 and the ARS 102 have been communicatively connected (e.g., ten minutes) and may be referred to a connection time period. In some instances, the connection may be determined based on the connection time period exceeding a time period threshold or a predetermined time threshold (e.g., five minutes) representing a maximum amount of time the UE 132 and the ARS 102 may be connected.

Figure 3:
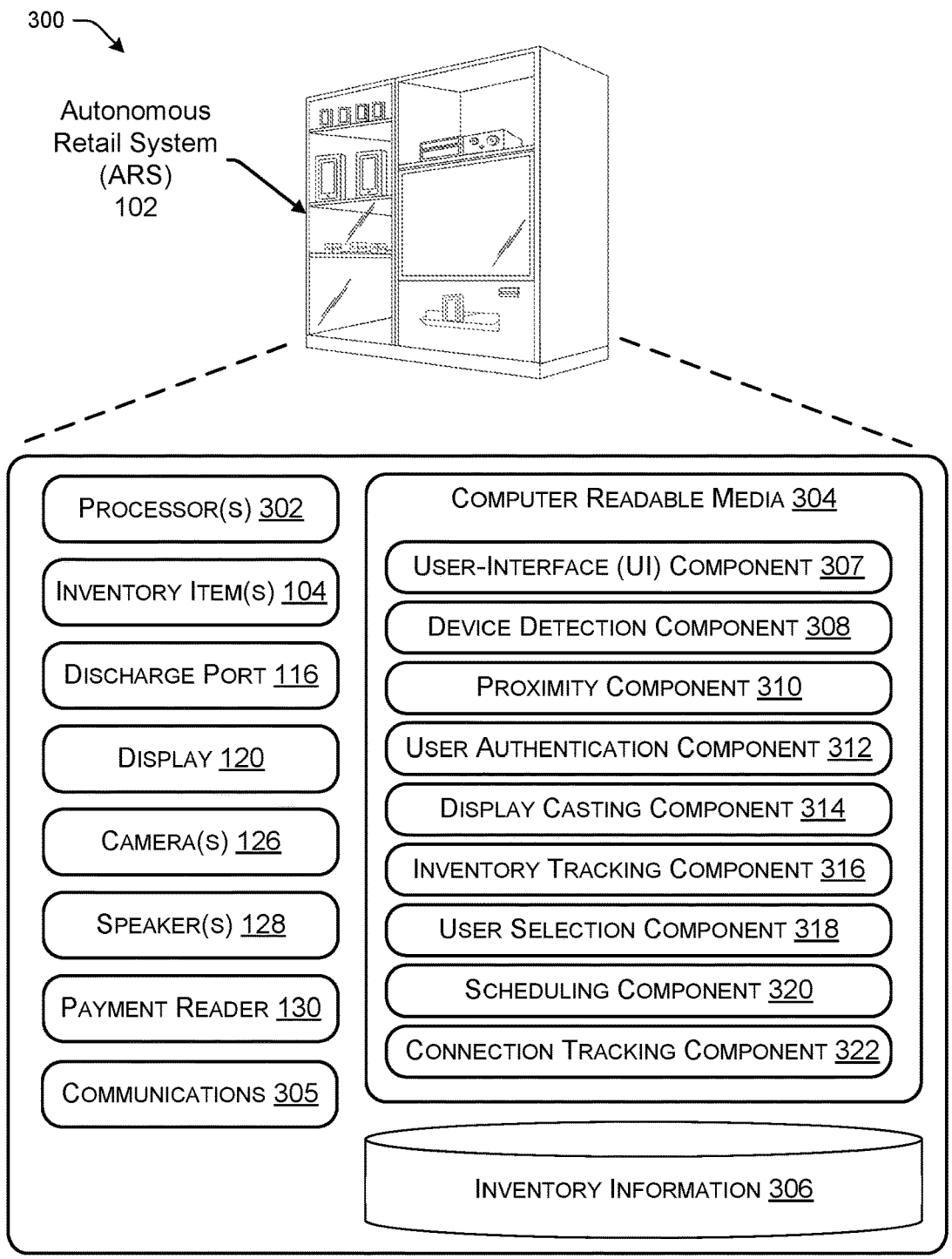
FIG. 3 illustrates an example ARS configured to connect to a UE and to dispense an item, in accordance with embodiments of the disclosure.

FIG. 3 illustrates an example ARS 102 configured to connect to a UE 132 and to dispense an item. FIG. 3 is a block diagram that also shows an example computing architecture 300 of the ARS 102. The computing architecture may include one or more processors 302 and one or more computer-readable media 304 that stores various modules, applications, programs, components, and/or other data.

In various embodiments, the one or more processors 302 may include a central processing unit (CPU), a graphics processing unit (GPU), both CPU and GPU, or other processing units or components.

In various embodiments, the computer-readable media 304 may include instructions that, when executed by the one or more processors 302, cause the processors to perform the operations described herein as being performed by, or capable of being performed by, the ARS 102. Embodiments of the computer-readable media 304 may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In various embodiments, the ARS 102 may include the inventory items 104 including inventory items 104(1)-104(3). The inventory may include items available via the ARS 102 for purchase. The ARS 102 may also include a discharge port 116 (e.g., to dispense purchased items), a display 120 (e.g., to display inventory items 104 of the ARS 102), a camera 126 (e.g., surveillance image sensors or facial detection sensors), a speaker 128 (e.g., to provide verbal instructions to meet user accessibility needs or for entertainment), and/or a payment reader 130 (e.g., a device that is configured to receive a debit and/or credit card). In some instances, the ARS 102 may include a communications component(s) 305 that can include any wired or wireless connections that allow the ARS 102 to communicate with one or more other components. For instance, the communications component(s) 305 can include a network interface card (NIC), a network adapter, a LAN adapter, or a physical, virtual, or logical address to connect to various network(s) 134, or to the user equipment 132. To increase throughput when exchanging wireless data, the communications component(s) 305 can utilize multiple-input/multiple-output (MIMO) technology. The communications component(s) 305 may include any sort of wireless transceivers capable of engaging in wireless, radio frequency (RF) communication. The communications component(s) 305 may also include other wireless modems, such as a modem for engaging in Wi-Fi, WiMax, Bluetooth, Bluetooth Low Energy, ZigBee, Z-Wave, LoRa, Thread, mesh network, infrared communication, or the like.

In various embodiments, the ARS 102 may include inventory information 306. The inventory information 306 may include information about the items contained in the inventory items 104. For example, the inventory information 306 may include any information about cellular-enabled devices (e.g., inventory items 104(1)), including but not limited to, manufacturer, model, color, price, storage capacity, identifying information, e.g., IMEI, ICCID, or any other information. Moreover, in some instances the user 106 may access non-physical items via the ARS 102, e.g., digital content, downloads, or the like, and the inventory information 306 may include information about such non-physical items.

In various embodiments, the computer-readable media 304 may include a user-interface (UI) component 307, a device detection component 308, a proximity component 310, a user authentication component 312, a display casting component 314, an inventory tracking component 316, a user selection component 318, a scheduling component 320, and/or a connection tracking component 322.

The user-interface (UI) component 307 may include functionality to cause display of various UIs to facilitate engagement of user 106 with the ARS 102. For instance, the UI component 307 may cause the display 120 to display UIs that provide instructions for interacting with the ARS 102, that display contents of the inventory items 104, that enable the user 106 to navigate the inventory items 104, and so forth. In some instances, the UI component 307 may customize, e.g., personalize, content displayed on the display 120 based on information received from the user, data received from the UE 132, and/or environmental data (e.g., time of day, weather, etc.). By way of non-limiting example, when the user 106 is a customer of the cellular service provider associated with the ARS 102, information about the user 106 may be determined from the user's account, e.g., by accessing a user profile. The user profile information may be used to customize UIs, e.g., by providing a personalized experience, which may include information about the user equipment 132, information about the user 106, historical information associated with the user 106 (e.g., a transaction history, usage data, messaging information, and so forth), information about the user's plan with the provider, information about other devices and/or people associated with the user 106 (e.g., family members in a family plan, devices associated with those family member, and so forth), or other information.

The device detection component 308 and the proximity component 310 may include functionality to facilitate automated identification of a UE 132 as well as facilitating automated identification of a physical location of the UE 132. In some instances, the proximity component 310 may include functionality to determine a signal strength between the UE 132 and the ARS 102. In some instances, the proximity component 310 may include functionality to identify a UE 132 based on receiving sensor information from one or more proximity sensors associated with the ARS 102. In some instances, the device detection component 308 may configure the ARS 102 to search for UE 132 that is associated with, e.g., supported by, a cellular and/or wireless network provider. In some instances, the cellular and/or wireless network provider may host or otherwise be affiliated with the ARS 102. The device detection component 308 may configure the communications component 305 to broadcast or otherwise transmit a signal that is detectable by UE 132 having a specific configuration. For instance, the UE 132 may have installed thereon an application or software that identifies the transmitted message. The signal received at the UE may configure the UE 132 to display a notification, e.g., to alert the user 106 to the presence of the ARS 102. In some instances, the UE 132 may respond to the signal, e.g., with a return message, which may include information about the UE 132 or confirm the presence of the UE 132, and the ARS 102, e.g., using the UI component 307 may display personalized UIs for the user 106. In some instances, the UE 132, once recognized via the device detection component 308, may be configured to interact with the ARS 102, e.g., to allow the UE 132 to display UIs generated by the UI component 307.

In various embodiments, the user authentication component 312 may include functionality to authenticate a user 106 and/or UE 132 in response to receiving user information. In some instances, the user information may include biometric information or passcode information obtained by leveraging biometric and/or security capabilities of the UE 132. In some instances, the user information may include logging into a cellular service provider account and/or providing password information via the UE 132 cellular service provider. For example, user information may represent facial detection information of a user 106 obtained via a UE camera 144 associated with the UE 132. In some instances, the facial detection data may be compared to other image data of the user 106, e.g., image data captured from the scan of the user's identification documentation or image data stored in connection with an account associated with the user 106. For example, by comparing the facial detection data captured by the UE camera(s) 144 to the scanned identification document, the ARS 102 may confirm that the user 106 is the person shown in the identification, e.g., to prevent someone from making unauthorized purchases using a stolen or otherwise ill-begotten identification document. Similarly, by comparing the image data captured by the UE camera(s) 144 to image information stored in association with an established account, the ARS 102 may confirm that the user 106 is associated with the account, instead of, for instance, using a stolen phone to make purchases against the account with which the phone is associated. For instance, the ARS 102 may implement facial recognition techniques on the captured image and compare recognized facial features to those of the scanned image and/or stored image data. In other implementations, the user's identity may be verified in other ways, including by asking the user 106 for login credentials (e.g., associated with an established account), by asking the user 106 to answer one or more security questions, using additional biometric screening techniques (e.g., retinal scans, fingerprint scans, etc.), and/or other methods.

In various embodiments, the display casting component 314 may include functionality to cast, reverse miracast, miracast, and cause presentation a display 120, textual elements 122, and inventory graphic elements 124 to a UE display 140 associated with the UE 132. Additional functionality of the display casting component 314 is discussed further herein with respect to FIGS. 4A and 4B.

In various embodiments, an inventory tracking component 316 may track a current inventory associated with the inventory items 104 of the ARS 102. In some instances, the inventory tracking component may include functionality to identify a quantity of inventory items 104(1)-104(3). In some instances, the ARS 102 may send a request to a remote computing system 136 to determine information associated with the inventory items 104 including inventory items 104(1)-104(3). In some instances, the inventory tracking component 316 may automatically determine a current inventory. For instance, in the case of multiple users at least partially simultaneously conducting transactions with the ARS 102, automatic and real-time updates associated with a current inventory of the ARS 102 may be determined.

In various embodiments, the user selection component 318 may include functionality to receive one or more indication(s) from a UE 132 and/or a user 106 to determine an action (e.g., purchase, rental, exchange, retrieval, and/or drop-off action), and/or an inventory item 104 associated with the selected action.

In various embodiments, a scheduling component 320 may include functionality to schedule multiple users at least partially simultaneously conducting transactions with the ARS 102. In some instances, the scheduling component 320 may include functionality to send retrieval tokens to user equipment associated with the multiple users, schedule multiple users, schedule the dispensing of items, and/or send notifications prompting a user 106 to retrieve an item from the ARS 102.

In various embodiments, the connection tracking component 322 may include functionality to automatically track connection information associated with a connection between a UE 132 and the ARS 102. In some instances, the connection information may include an initial time the connection between the UE 132 and the ARS 102 was established, a connectivity or signal strength between the UE 132 and the ARS 102, a termination time may be associated with a time at which a connection was terminated between UE 132 and the ARS 102. In some instances, user-interface (UI) component 307, a device detection component 308, a proximity component 310, a user authentication component 312, a display casting component 314, an inventory tracking component 316, a user selection component 318, a scheduling component 320, and/or a connection tracking component 322 may include functionality to work individually or in combination.

Figure 4A:
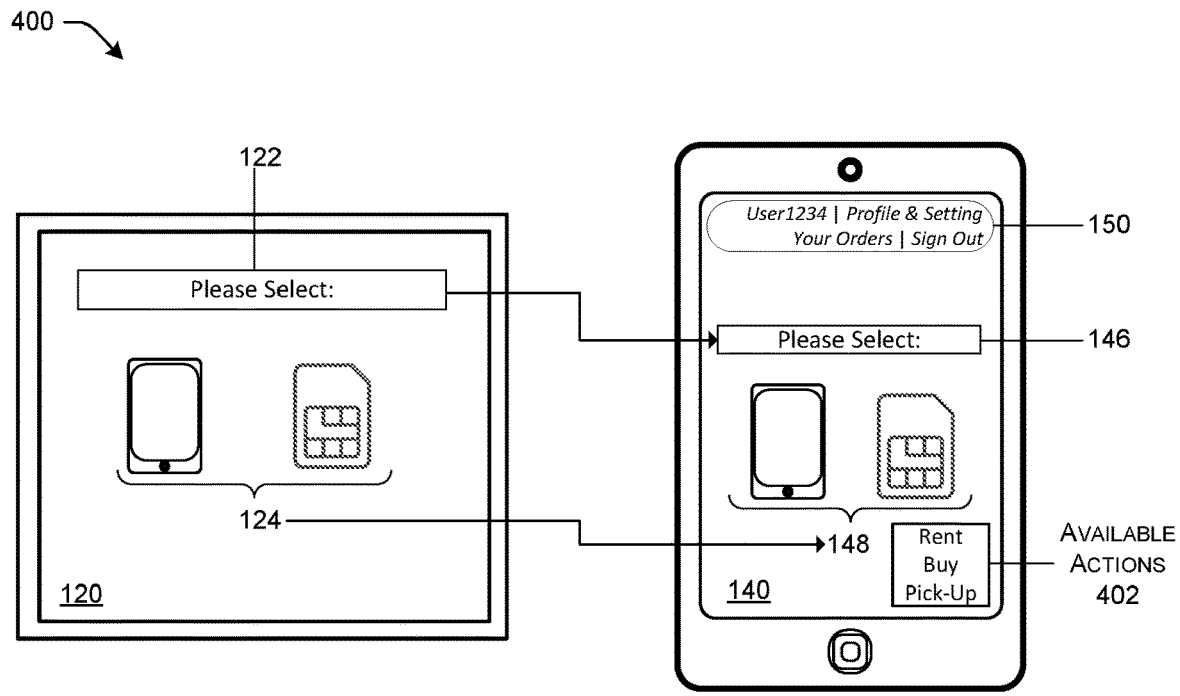
FIGS. 4A and 4B illustrate example screen mirroring and inventory display embodiments in the context of an ARS and a UE, in accordance with embodiments of the disclosure.
Figure 4B:
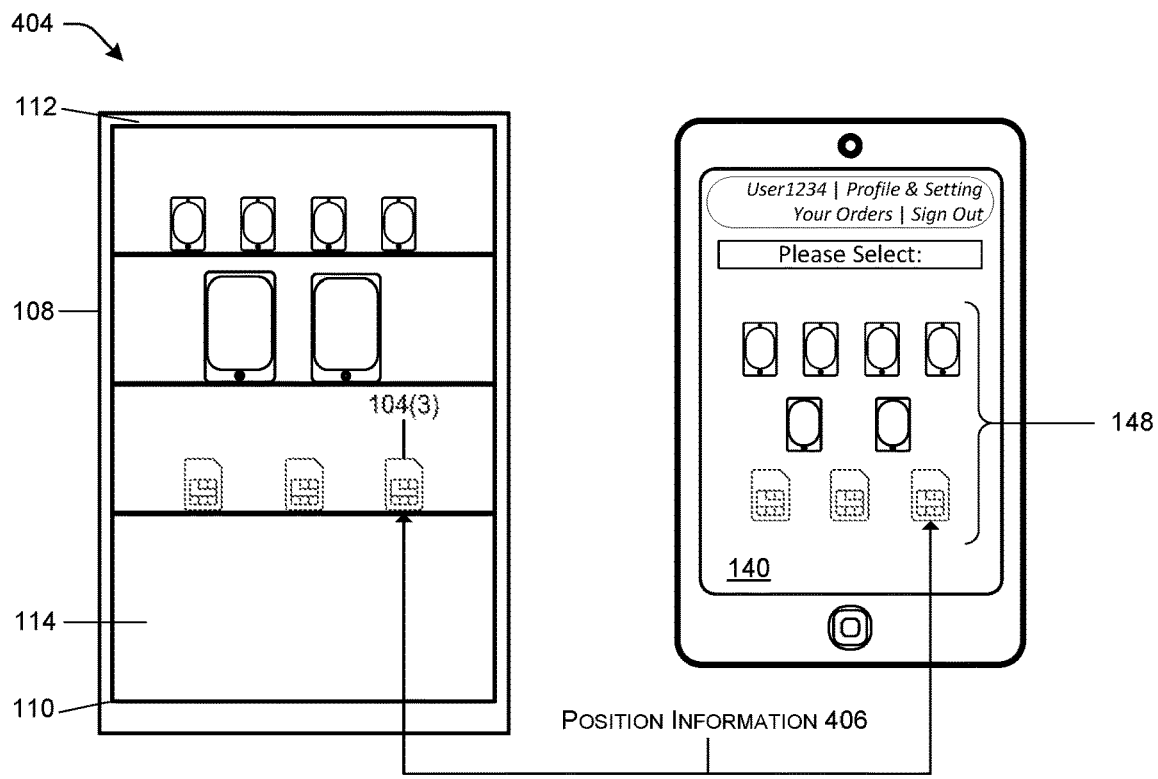

FIGS. 4A and 4B illustrate example screen mirroring and inventory display embodiments sent by an ARS 102 and received by UE, in accordance with embodiments of the disclosure. FIG. 4A illustrates an example environment 400 for casting a display 120 associated with the ARS 102 onto a UE display 140 associated with a UE 132. As illustrated, display 120 may present textual elements 122 and inventory graphic elements 124. As illustrated, textual elements 122 include an instruction to select an item. As illustrated, inventory graphic elements 124 represent a tablet device and a SIM card available in an inventory of the ARS 102. As illustrated, the ARS 102 may miracast, reverse miracast, cast, screen mirror, or cause display and/or presentation of textual elements 122 and inventory graphic elements 124 onto UE display 140. As illustrated, UE textual elements 146 are associated with textual elements 122 and UE graphic elements 148 is associated with inventory graphic elements 124. As illustrated, textual elements 122 and inventory graphic elements 124 are presented via display 120 at a first location with a first layout. For instance, the text is located above the graphical icons in display 120. In addition, the tablet device graphic element is presented to the left of the SIM card graphic element. The UE textual elements 146 and the UE graphic elements 148 are presented at a second location with a second layout via the UE display 140 that substantially corresponds to the first location and the first layout. As illustrated, the UE display may include additional elements not displayed on the display 120 associated with the ARS 102. As illustrated, the UE display 140 additionally includes user account settings 150 and available actions 402.

FIG. 4B illustrates an example environment 404 for determining position information 406 associated with an inventory of the ARS 102. As illustrated, the ARS 102 may be a tangible structure with wall(s) 108, a base 110, a roof 112, and a merchandise display section 114. As illustrated the merchandise display section 114 may be transparent to display inventory item 104(3). In some instances, the merchandise display section 114 may be opaque, semi-opaque, and/or a non-transparent material that obscures inventory item 104(3) from view. As illustrated, position information 406 may be determined based on a physical location of inventory item 104(3). For instance, inventory item 104(3) may be a first position associated with position information 406. The first position may be determined using at least one of a weight sensor, a coordinate sensor, an image sensor, or any physical and/or sensory apparatus that facilitates determining a position of a physical object included in the ARS 102. As illustrated, inventory item 104(3) is located at a bottom, right corner of the ARS 102 relative to other inventory items. The ARS 102 may cause presentation of the inventory item 104(3) based at least in part on the position information. As illustrated, an icon representing inventory item 104(3) is associated with UE graphic element 148 in a bottom, right corner of the UE display 140 relative to other icons representing other inventory items. In other words, the position information 406 may be used to translate a first, physical position of inventory item 104(3) into a graphical position of a UE display 140 that substantially corresponds to the physical position.

FIG. 5 illustrates an example environment 500 including an ARS 102 and a threshold 152, in accordance with embodiments of the disclosure. As illustrated, the ARS 102 may include wall(s) 108, a base 110, a roof or cover 112, and a merchandise display section 114 that may be used to physically enclose inventory items. As illustrated, the ARS 102 may include a discharge port 116 to dispense selected item(s) 118, a display 120 to display textual elements 122 and inventory graphic elements 124, one or more cameras and/or one or more image sensors 126, one or more speakers 128, and a payment reader 130. Although not illustrated, the ARS 102 may include a device detection component 308 and a proximity component 310 that may provide functionality to automatically detect UE 132 within a threshold 152. As illustrated, the threshold 152 may include a distance threshold 502 and/or a signal strength threshold 504.

Figure 6:
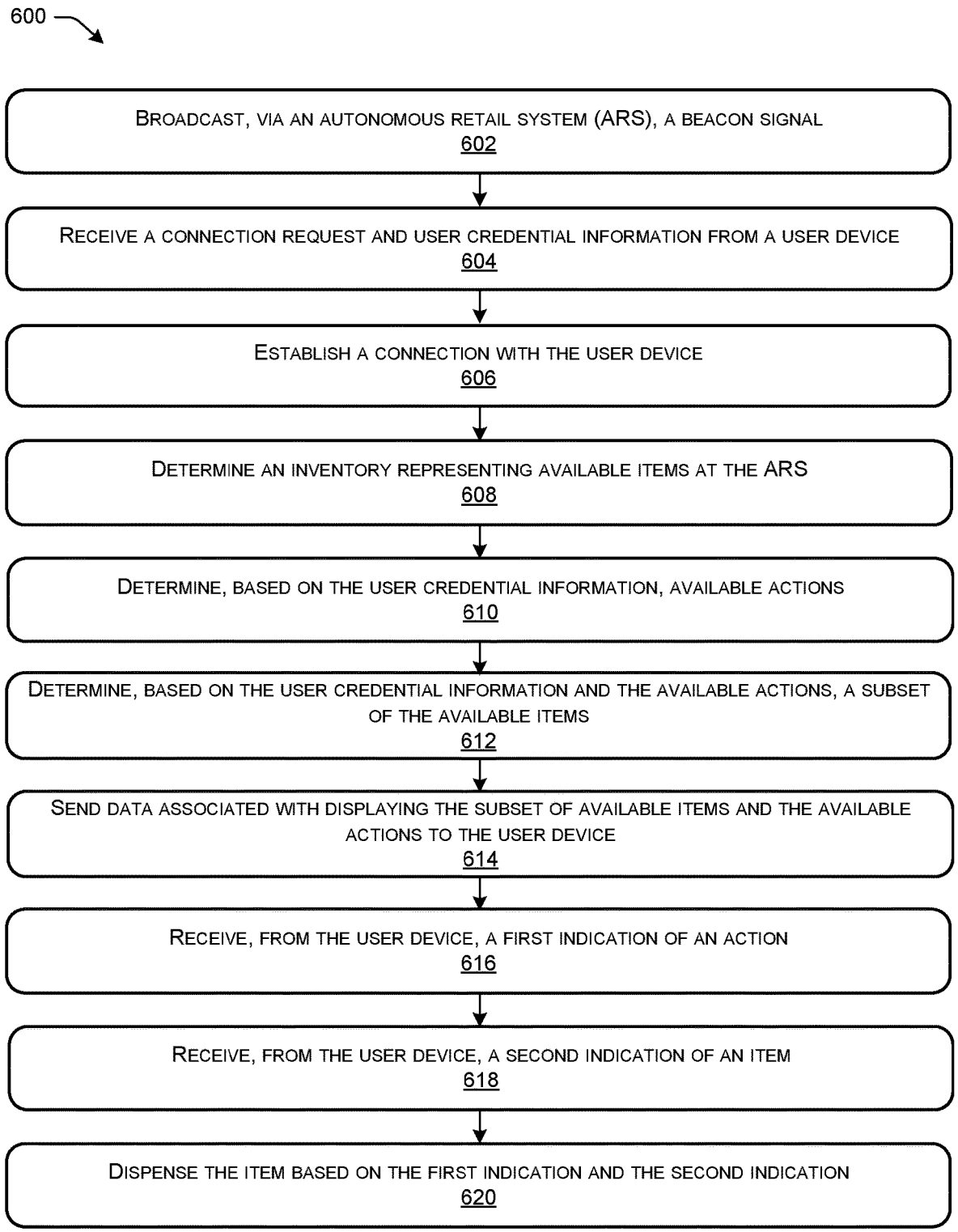
FIG. 6 illustrates an example process for identifying a UE, establishing a connection between the UE and an ARS, and dispensing an item, in accordance with embodiments of the disclosure.

FIG. 6 illustrates an example process 600 for identifying UE, establishing a connection between UE and an ARS, and dispensing an item, in accordance with embodiments of the disclosure. The example process 600 may be performed by the ARS 102 and associated components of the computer-readable media 304. Some or all of the process 600 may be performed by one or more devices, equipment, or components illustrated in FIGS. 1, 3, and 5, for example.

At operation 602, the process may include sending from an autonomous retail system (ARS), a connection request to a user device. In various embodiments, the connection request may be sent to a user device below a distance threshold associated with the ARS. In some instances, the ARS may broadcast a beacon signal that may be received by the user device.

At operation 604, the process may include receiving a connection request and user credential information from the user device. In various embodiments, the user credential may include account information such as a password or biometric information obtained via the ARS and/or the user device.

At operation 606, the process may include establishing a connection with the user device.

At operation 608, the process may include determining an inventory representing available items at the ARS. In various embodiments, the inventory may include electronic device(s).

At operation 610, the process may include determining, based on the user credential information, available actions. In various embodiments, users that have accounts with a cellular service provider may be presented with available actions including purchasing, renting, and/or picking up an item.

At operation 612, the process may include determining, based on the user credential information and/or the available actions, a subset of the available items at the ARS. In various embodiments, the subset of available items may be based on an availability of inventory items.

At operation 614, the process may include causing display, on the user device, the subset of the available items and the available actions. In various embodiments, the ARS may send data to the user device, the data associated with displaying the available actions and/or the subset of available items At operation 616, the process may include receiving, from the user device, a first indication of an action. In various embodiments, the first indication may be a user selection of an action (e.g., a purchase action).

At operation 618, the process may include receiving, from the user device, a second indication of an item. In various embodiments, the second indication by a user selection of an item (e.g., a tablet device).

At operation 620, the process may include dispensing the item based on the first indication and the second indication. In various embodiments, a user may retrieve the item from the ARS and terminate the connection between the user device and the ARS.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
broadcasting, via an autonomous retail system, a beacon signal;
receiving a connection request and user credential information from a user device;
establishing, based at least in part on the user credential information, a connection with the user device;
determining an inventory representing available items at the autonomous retail system;
determining, based at least in part on the user credential information, available actions;
determining, based at least in part on the available actions, a subset of the available items;
sending data to the user device, the data associated with displaying, on the user device, the available actions and the subset of the available items;
receiving, from the user device, a first indication of an action of the available actions;
receiving, from the user device, a second indication of an item of the subset of the available items; and
dispensing, by the autonomous retail system, the item based at least in part on the first indication and the second indication.

2. The method as recited in claim 1, wherein the autonomous retail system comprises a first display and the user device comprises a second display, and further comprising:
displaying, via the first display, a first graphic element representing the item at a first location; and wherein the data comprises a second graphic element representing the item, wherein the first location of the first graphic element presented via the first display substantially corresponds to a second location of the second graphic element to be presented via the second display.

3. The method as recited in claim 1, further comprising:
determining a distance between the autonomous retail system and the user device; and
determining that the distance is below a distance threshold, wherein establishing the connection is based at least in part on determining the distance is below the distance threshold.

4. The method as recited in claim 1, wherein the user device is a first user device, the connection is a first connection, and further comprising:
receiving a second connection request and second user credential information from a second user device;
establishing a second connection with the second user device; and
scheduling, in a service order, the first user device and the second user device based at least in part on a first time associated with the first connection and a second time associated with the second connection.

5. The method as recited in claim 1, further comprising:
determining a connection time period between the autonomous retail system and the user device based at least in part on the connection; and
terminating the connection with the user device based on at least one of dispensing the item or the connection time period exceeding a predetermined time period threshold.

6. A method comprising:
receiving, from a user device and by an autonomous retail system, a connection request and user information;
establishing, based at least in part on the user information, a connection with the user device;
determining a plurality of actions associated with the autonomous retail system;
determining, based at least in part on the user information, an action of the plurality of actions;
sending data to the user device, the data associated with displaying, on the user device, the action and an item associated with the action;
receiving, from the user device, a first indication of the action;
receiving, from the user device, a second indication of the item; and
dispensing, by the autonomous retail system, the item based at least in part on the first indication and the second indication.

7. The method as recited in claim 6, wherein the autonomous retail system includes at least a first display and the user device includes a second display, the method further comprising;
displaying, via the first display, a first element representing the item at a first location on the first display; and wherein the data comprises a second element representing the item to be presented at a second location on the second display, wherein the second location is based at least in part on the first location.

8. The method as recited in claim 6, further comprising:
determining at least one of a distance or a signal strength between the autonomous retail system and the user device; and
determining at least one of the distance being below a distance threshold or the signal strength being equal to or above a signal strength threshold, and wherein sending the connection request is based on at least one of determining the distance is below the distance threshold or determining the signal strength is equal to or above the signal strength threshold.

9. The method as recited in claim 6, wherein the user device is a first user device, the connection is a first connection, the method further comprising:
receiving, from a second user device, a second connection request;
receiving second user information from second the user device;
establishing a second connection with the second user device; and
scheduling, in an order, the first user device and the second user device based at least in part on a queue type.

10. The method as recited in claim 6, further comprising terminating the connection with the user device based on at least one of:
dispensing the item;
determining a distance between the autonomous retail system and the user device;
determining a signal strength between the autonomous retail system and the user device;
determining a connection time is equal to or above a predetermined time period threshold, wherein the connection time is based at least in part on the connection; or
determining an inactivity period is equal to or above a predetermined inactivity threshold, wherein the inactivity period based at least in part on the connection.

11. The method as recited in claim 6, wherein the user information includes at least one of biometric information, account information, or profile information, the method further comprising:
  authenticating the user device based at least in part on receiving the user information from the user device.

12. The method as recited in claim 6, wherein the item is included in an inventory of the autonomous retail system, and wherein the action includes at least one of a purchase action, a rental action, an exchange action, a retrieval action, or a drop-off action.

13. The method as recited in claim 6, wherein receiving the first indication of the action further comprises, receiving, from the user device, first user input data indicating a selection of the action, and wherein receiving the second indication of the item further comprises, receiving, from the user device, second user input data indicating a selection of the item.

14. An autonomous retail system, comprising:
  one or more processors; and
  memory to store computer-readable media storing instructions that are executable by the one or more processors to perform acts comprising:
    sending, from the autonomous retail system, a connection request to a user device;
    receiving user information from the user device;
    establishing, based at least in part on the user information, a connection with the user device;
    determining a plurality of actions and a plurality of items associated with the autonomous retail system;
    determining, based at least in part on the user information, an action of the plurality of actions;
    sending data to the user device, the data associated with displaying, on the user device, the action and an item of the plurality of items associated with the action;
    receiving, from the user device, a first indication of the action;
    receiving, from the user device, a second indication of the item; and
    dispensing, by the autonomous retail system, the item based at least in part on the first indication and the second indication.

15. The autonomous retail system as recited in claim 14, wherein the autonomous retail system includes at least a first display and the user device includes a second display, and wherein the acts further comprise:
  displaying, via the first display, a first element representing the item at a first location on the first display; and
  wherein the data comprises a second element representing the item to be presented at a second location on the second display, wherein the second location is based at least in part on the first location.

16. The autonomous retail system as recited in claim 14, the acts further comprising:
  determining at least one of a distance or a signal strength between the autonomous retail system and the user device; and
  determining at least one of the distance being below a distance threshold or the signal strength being equal to or above a signal strength threshold, and wherein sending the connection request is based on at least one of determining the distance is below the distance threshold or determining the signal strength is equal to or above the signal strength threshold.

17. The autonomous retail system as recited in claim 14, wherein the user device is a first user device, the connection is a first connection, and wherein the acts further comprise:
  sending, from the autonomous retail system, a second connection request to a second user device;
  receiving second user information from the second user device;
  establishing a second connection with the second user device; and
  scheduling, in an order, the first user device and the second user device based at least in part on a queue type.

18. The autonomous retail system as recited in claim 14, the acts further comprising terminating the connection with the user device based on at least one of:
  dispensing the item;
  determining a distance between the autonomous retail system and the user device;
  determining a signal strength between the autonomous retail system and the user device;
  determining a connection time is equal to or above a predetermined time period threshold, wherein the connection time is based at least in part on the connection; or
  determining an inactivity period is equal to or above a predetermined inactivity threshold, wherein the inactivity period based at least in part on the connection.

19. The autonomous retail system as recited in claim 14, wherein the user information includes at least one of biometric information, account information, or profile information; and wherein the acts further comprise:
  authenticating the user device based at least in part on receiving the user information from the user device.

20. The autonomous retail system as recited in claim 14, wherein the plurality of items includes an inventory of the autonomous retail system, and wherein the action includes at least one of a purchase action, a rental action, an exchange action, a retrieval action, or a drop-off action.

* * * * *